(12) United States Patent
Scag et al.

(10) Patent No.: US 6,490,849 B1
(45) Date of Patent: Dec. 10, 2002

(54) LAWN MOWER WITH A PLATFORM FOR A STANDING OPERATOR

(75) Inventors: Dane T. Scag, Elm Grove, WI (US); Mark C. Bland, New Albany, IN (US)

(73) Assignee: Great Dane Power Equipment, Inc., Elm Grove, WI (US)

( * ) Notice: Subject to any disclaimer, the term of this patent is extended or adjusted under 35 U.S.C. 154(b) by 0 days.

(21) Appl. No.: 09/597,316

(22) Filed: Jun. 19, 2000

Related U.S. Application Data
(60) Provisional application No. 60/157,385, filed on Oct. 1, 1999.

(51) Int. Cl.[7] .................. A01D 34/03; A01D 34/43; A01D 34/64
(52) U.S. Cl. .................. 56/16.7; 56/10.8; 56/14.7
(58) Field of Search ................. 56/14.5, 16.7, 56/15.4, 10.1, 323; 130/6.48, 6.5, 6.62, 19.1, 19.2, 19.3; 280/870.43, 760, 32.7

(56) References Cited

U.S. PATENT DOCUMENTS

| | | |
|---|---|---|
| 1,865,365 A | 6/1932 | Foote |
| 2,702,977 A | 3/1955 | Carter |
| 2,705,393 A | 4/1955 | Cofer |
| 2,797,957 A | 7/1957 | North |
| 3,229,452 A | 1/1966 | Hasenbank |
| 3,485,314 A | 12/1969 | Herr |
| 4,096,920 A | 6/1978 | Heyn |
| 4,770,440 A | 9/1988 | Lander |
| 4,809,796 A * | 3/1989 | Yamaoka et al. .......... 180/6.48 |
| 4,828,250 A * | 5/1989 | Reiche .................. 272/92 |
| 4,878,339 A | 11/1989 | Marier et al. |
| 4,920,733 A * | 5/1990 | Berrios ................ 56/10.9 |
| 5,004,251 A | 4/1991 | Velke et al. |
| 5,106,256 A | 4/1992 | Murakami et al. |
| 5,117,944 A | 6/1992 | Hurtevent |
| 5,118,123 A * | 6/1992 | Betrock ................ 280/32.7 |
| 5,307,612 A | 5/1994 | Tomiyama et al. |
| 5,388,850 A | 2/1995 | Sinone |
| 5,413,364 A | 5/1995 | Hafendorfer |
| 5,463,853 A | 11/1995 | Santoli et al. |
| 5,507,138 A * | 4/1996 | Wright et al. ............ 56/14.7 |
| 5,653,466 A | 8/1997 | Berrios |
| 5,765,347 A * | 6/1998 | Wright et al. ............ 56/14.7 |
| 5,809,755 A * | 9/1998 | Velke et al. ............. 56/10.8 |
| 5,809,756 A | 9/1998 | Scag et al. |
| 5,947,490 A * | 9/1999 | Munnoch et al. .......... 280/32.7 |
| 5,964,082 A * | 10/1999 | Wright et al. ............ 56/14.7 |
| 5,984,031 A * | 11/1999 | Velke et al. ............. 180/6.48 |
| 6,189,304 B1 * | 3/2000 | Velke et al. ............. 56/14.7 |
| 6,189,305 B1 * | 4/2000 | Wright et al. ............ 56/14.7 |
| 6,059,055 A * | 5/2000 | Velke et al. ............. 180/19.1 |
| 6,085,504 A * | 7/2000 | Wright et al. ............ 56/14.7 |
| 6,094,897 A * | 8/2000 | Velke et al. ............. 56/14.7 |
| 6,139,032 A * | 10/2000 | Hartman ................ 280/32.7 |
| 6,185,920 B1 * | 2/2001 | Oxley ................. 56/14.7 |
| 6,205,753 B1 * | 3/2001 | Velke et al. ............. 56/14.7 |
| 2001/0001170 A1 * | 5/2001 | Velke et al. ............. 56/14.7 |

* cited by examiner

Primary Examiner—Robert E. Pezzuto
Assistant Examiner—Árpád Fábián Kovács
(74) Attorney, Agent, or Firm—William K. Baxter; Godfrey & Kahn, S.C.

(57) ABSTRACT

A powered lawn mower having a frame, an engine mounted to the frame, a set of front wheels and a set of rear drive wheels connected to the frame. Attached to the rear of the frame is a standing platform positioned in front of the rear wheel axles so that the center of gravity is moved forward over the center of the mower with an operator standing on the platform. The positioning of the platform substantially improves the stability and safety of the mower. The platform, capable of supporting the weight of a standing operator, is mounted to the frame of the mower with a plurality of springs mounted between the platform and the frame to cushion the ride of the operator. The mower may also include as seat assembly removably attachable to the frame of the mower and positioned substantially above the platform. The seat assembly includes an attachment mechanism designed to be removably attached to the frame, so that an operator can choose between a standing position and a seated position.

21 Claims, 7 Drawing Sheets

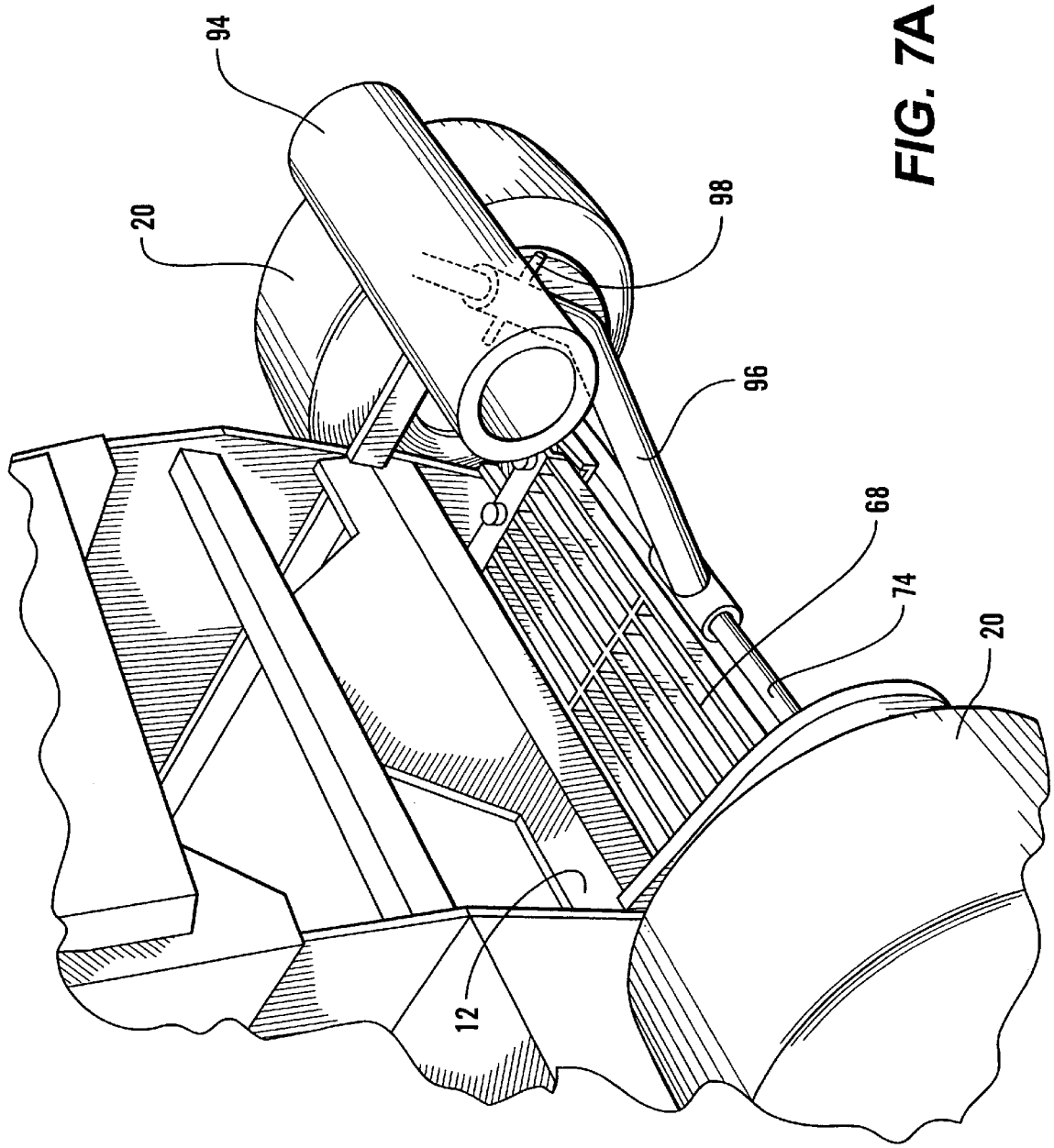

LAWN MOWER WITH A PLATFORM FOR A STANDING OPERATOR

CROSS-REFERENCE TO RELATED APPLICATION

This application claims the benefit of U.S. Provisional Application Ser. No. 60/157,385, filed Oct. 1, 1999.

BACKGROUND OF THE INVENTION

The present invention relates generally to lawn mowers, and the more particularly to self-propelled, walk-behind commercial type lawn mowers having a platform attached to the rear of the mower for accommodating a standing operator.

Most current lawn mowers designed for commercial use are either dedicated walk-behind lawn mowers or conventional riding lawn mowers. Commercial type riding lawn mowers are generally quite large, heavy and difficult to maneuver around obstacles, such as trees and shrubs and the like. An example of such a riding lawn mower is shown in U.S. Pat. No. 4,809,796 to Yamaoka et al. Riding lawn mowers are also quite expensive to purchase and maintain. The substantial cost of purchasing and maintaining riding mowers has led lawn mower service companies to rely more heavily on the use of lower cost, mid-size, walk-behind rotary mowers.

The walk-behind mowers are generally smaller, more maneuverable, and less expensive than riding mowers. Being self-powered, these mowers are capable of cutting large areas of grass. The walk-behind mowers are also relatively simple to operate, and inexpensive to purchase and maintain compared to riding lawn mowers. In addition, these mowers are generally safer and more useful in mowing steep hills. Furthermore, they are small enough to be easily stored and transported by commercial lawn mower service companies. One example of a self-powered, walk-behind mower is shown in U.S. Pat. No. 4,920,733 to Berrios.

However, a major disadvantage of walk-behind mowers is that they require the operator to walk the entire area of grass being cut. This may account for up to eight or more hours walking per day, which can be a very exhausting experience over the period of a full work day, even if the mower is self-powered.

Because walk-behind mowers are still fairly heavy and cumbersome pieces of equipment to maneuver, various types of attachments have been designed to reduce the amount of walking required by operators. These attachments, commonly known as sulkies, allow an operator to ride behind the mower in a reasonably comfortable standing or seated position during prolonged operation of the mower. A sulky is typically a wheeled attachment having a standing platform or a seat that is removably attached to the back end of the mower. Patents showing a sulky attached to a self-propelled, walk-behind lawn mower include U.S. Pat. Nos. 5,004,251 to Velke et al; 5,388,850 to Simone; and 5,413,364 to Hafendorfer. In using a stand-up sulky, the operator stands on a platform, while in using a sit-down sulky, the operator sits in an upright position on a seat that is customarily mounted at the rear of the sulky, with the operator's feet resting on a platform.

The use of sulky attachments for walk-behind mowers has not been entirely satisfactory because they often restrict maneuverability of the mower. The sulky adds considerable length to the mower, making it difficult to maneuver around obstacles, such as trees and shrubs and the like. In addition, the sulky does not permit easy reverse movement of the mower because it pivots around the attachment point on the mower, and can easily jack-knife.

There have also been a number attempts to design a lawn mower having a standing platform attached to the rear of the mower for supporting a standing operator. Examples of patents disclosing these types of mowers include U.S. Pat. Nos. 4,878,339 to Marier et al.; 5,507,138 to Wright, et al, 5,653,466 to Berrios; 5,809,756 to Scag et al.; and 6,059,055 to Velke, et al. All of these patents show a standing platform attached to the rear of the mower behind or at the rear wheel axle. The position of the platform on the mower as shown in the prior art creates a generally unstable and unsafe operating condition for a standing operator. An operator standing on the platform moves the center of gravity toward the rear of the mower making it very unstable to operate especially on hills.

Most prior art lawn mowers having a platform for supporting standing operators have the platform attached to the mower either behind the rear wheel axle or substantially on the rear wheel axle. This location has many inherent problems. The center of gravity of the mower with an operator standing on the platform is typically only a few inches in front of the rear wheels and about three feet above the ground, resulting in the mower being vulnerable to tipping backward. This limits the maximum pitch angle of a slope that may be safely mowed before the front of the mower tips back causing a dangerous condition.

Accordingly, there is a need for an improved walk-behind lawn mower having a standing platform attached to the rear of the mower and positioned so that the center of gravity is located toward the center of the mower to provide a safer, more stable operating condition while being operated by an operator standing on the platform.

SUMMARY OF THE INVENTION

Therefore, in view of the problems associated with the above types of lawn mowers, it is an object of the present invention to provide a lawn mower having a platform attached to the rear of the mower for accommodating a standing operator, with the platform positioned in front of the rear wheel axles so that the center of gravity of the mower is toward the center of the mower near the engine. Positioning the center of the platform in front of the rear wheel axles greatly improves the stability and safety of the mower, especially on hilly terrain.

These and other objects are met by the lawn mower of the present invention. The lawn mower comprises a frame and a mower deck with an engine mounted thereon. The engine provides power to a plurality of cutting blades mounted within the mower deck and to a pair of rear drive wheels. The frame includes a substantially horizontal front portion supporting the mower deck and engine, and a substantially vertical rear portion. Operator controls are mounted to an operator console extending outwardly from the upper end of the rear portion of the frame.

The mower further comprises a platform positioned between the rear drive wheels and in front of a vertical plane created by the rotational axis of the rear wheels.

In some embodiments, a seat assembly is removably attached to the frame so that an operator can sit down or lean against the seat while operating the mower. The seat assembly includes an attachment mechanism designed to be removably attached to the rear frame of the mower. The seat is preferably a bicycle or bolster-type seat positioned at or near a vertical plane created by the rotational axis of the rear wheels, and substantially above the platform. The seat may also be used to relieve the body weight from fatiguing legs and feet of an operator.

The present invention provides many advantages over lawn mowers of the prior art. In particular, the operator will be less frightened, not having to walk all day long while mowing. In addition, the mower can be operated at higher ground speeds, since it not limited to an operator's walking speed. The present invention also moves the center of gravity forward several inches from prior art standing operator machines, thus allowing an operator to mow up steeper hills, and while accelerating, with improved stability and safety. The chances of tipping the mower are substantially reduced. Another advantage is that the centrifugal force occurring during turns causes the operator to feel a force toward the mower, rather than away, as was the case with prior standing operator mowers, giving the operator a more secure feeling. An additional benefit is eliminating the need to add forward ballast to the front of the mower to move the center of gravity forward, as demonstrated in prior art machines. This reduction of ballast has the further advantage of reducing tire forces on the ground, thus reducing tire marks on a freshly mowed lawn. Another benefit is that when the operator wishes to relive fatigue from standing, he or she can add a seat assembly on which to sit or lean during operation. An additional advantage is that any bounding effect, brought about by the mower traversing rough ground, is in phase with the mower deck bouncing, and the amplitude of the bouncing is reduced, as resulting an improved comfort for the operator.

Various other features, objects, and advantages of the invention will be made apparent to those skilled in the art from the accompanying drawings and detailed description thereof.

BRIEF DESCRIPTION OF THE DRAWINGS

FIG. 7A is a perspective view of the rear of a lawn mower, showing a bolster-type seat attached to the frame of the mower above the platform.

DESCRIPTION OF THE PREFERRED EMBODIMENTS

The present invention is directed to a self-propelled lawn mower having a platform attached to the rear frame of the mower for accommodating a standing operator. The platform is positioned in front of the rear wheel axles so that the center of gravity is located toward the center of the mower to provide greater stability and safety for the operator.

Figure 1:
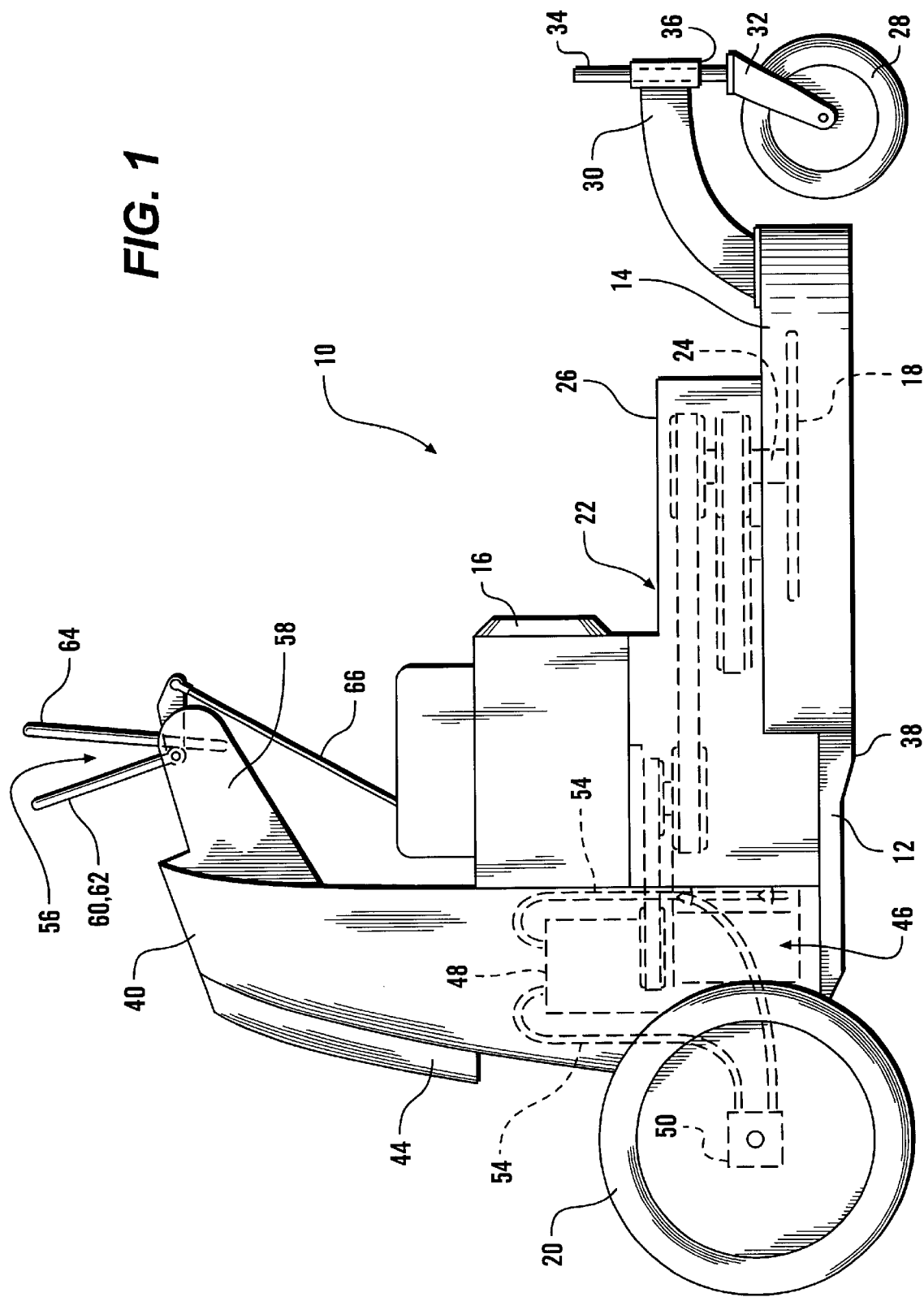
FIG. 1 is a side elevational view of a powered lawn mower constructed according to a preferred embodiment of the invention.

Referring first to FIG. 1, a lawn mower 10 is shown, constructed in accordance with a preferred embodiment of the present invention. The lawn mower 10 includes a rigid frame 12 and a mower deck 14 with an engine 16 mounted thereon for powering a plurality of cutting blades 18 mounted within the mower deck 14 and a pair of rear drive wheels 20. Power is applied from the engine 16 to the cutting blades 18 through a belt and pulley assembly 22.

The cutting blades 18 rotate in a horizontal plane on vertical shafts 24 coupled to the engine 16 by the belt and pulley assembly 22 located under a cover 26 above the mower deck 14. A pair of ground engaging caster wheels 28 supports the front end of the mower 10. In the embodiment shown, the caster wheels 28 are mounted forward of the mower deck 14 by a bracket assembly 30 attached to the front of the mower deck 14. The caster wheels 28 are mounted on a bracket 32 having a post 34 extending upwardly therefrom which is inserted into a cylindrical opening 36 at one end of the bracket assembly 30 allowing for pivotal rotation of the caster wheel 28 when the mower is turning.

The rear drive wheels 20 are powered by the engine 16 by the belt and pulley assembly 22 coupled to a drive system 46. The drive system 46 preferably includes two hydraulic pumps 48 feeding two hydraulic motors 50, one to drive each of the two rear wheels 20. The wheels 20 are preferably mounted on axles 52 of the two hydraulic drive motors 50. Each hydraulic drive motor 50 is in fluid communication with its respective hydraulic pump 48 by a plurality of hoses 54. The amount and direction of flow of hydraulic fluid is controlled by operator controls 56 mounted on an upper portion 40 of the frame 12. The frame 12 includes a substantially horizontal front portion 38 for supporting the mower deck 14, wheels 20 and engine 16, and a substantially vertical rear portion 40 for supporting a standing operator 42.

Figure 2:
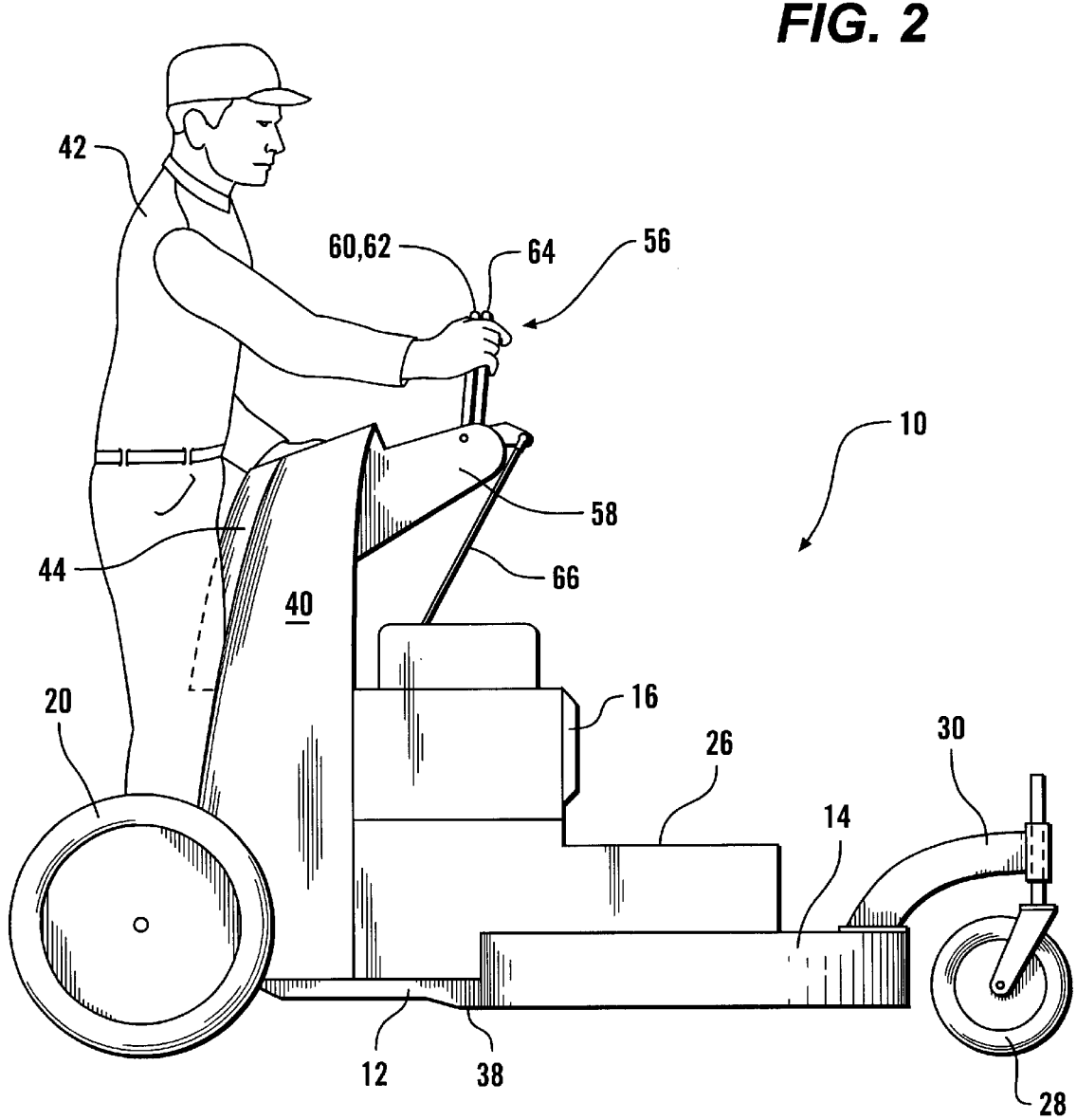
FIG. 2 is a side elevational view of the lawn mower of FIG. 1, showing an operator standing on a platform of the mower.

The operation of the mower 10 is substantially as described in U.S. Pat. No. 5,809,756, the disclosure of which is incorporated herein by reference in its entirety. Referring to FIG. 2, an operator 42 is shown standing on a platform 68 attached to the frame 12 and leaning against a padded cushion 44 attached to the outside of the rear portion 40 of the frame 12. Operator controls 56 are mounted to an operator console 58 extending outwardly from the upper end of the rear portion 40 of the frame 12. The operator controls 56 include a pair of control levers 60, 62, one for each pump 48 and in turn each and motor 50. The control levers 60, 62 are coupled to the drive system 46 through a pair of control rods 66 extending to a linkage mechanism in the drive system 46. The levers 60, 62 are spring loaded to return to a position corresponding to neutral when released by the operator 42. Each lever 60, 62 includes an upright component and a generally horizontal component that extends in front of the operator 42. Pushing both levers 60, 62 forward causes the mower to move forward. Pulling both levers 60, 62 back causes the mower to move in reverse. Pushing one lever forward while pulling the other lever back, or not pushing the second lever as far forward, causes the mower to turn. When both levers 60, 62 are released, the rear drive wheels 20 stop rotating and the mower stops after application of the brakes. The lawn mower preferably includes a dual brake system with rear wheel interference brake members contacting the rear wheels during braking. A stationary horizontal bar 64 is affixed to the operator console 58 and positioned forward of the levers 60, 62, to provide a stable and fixed frame of reference for the hands of the operator 42 to easily control the leavers 60, 62.

Figure 3:
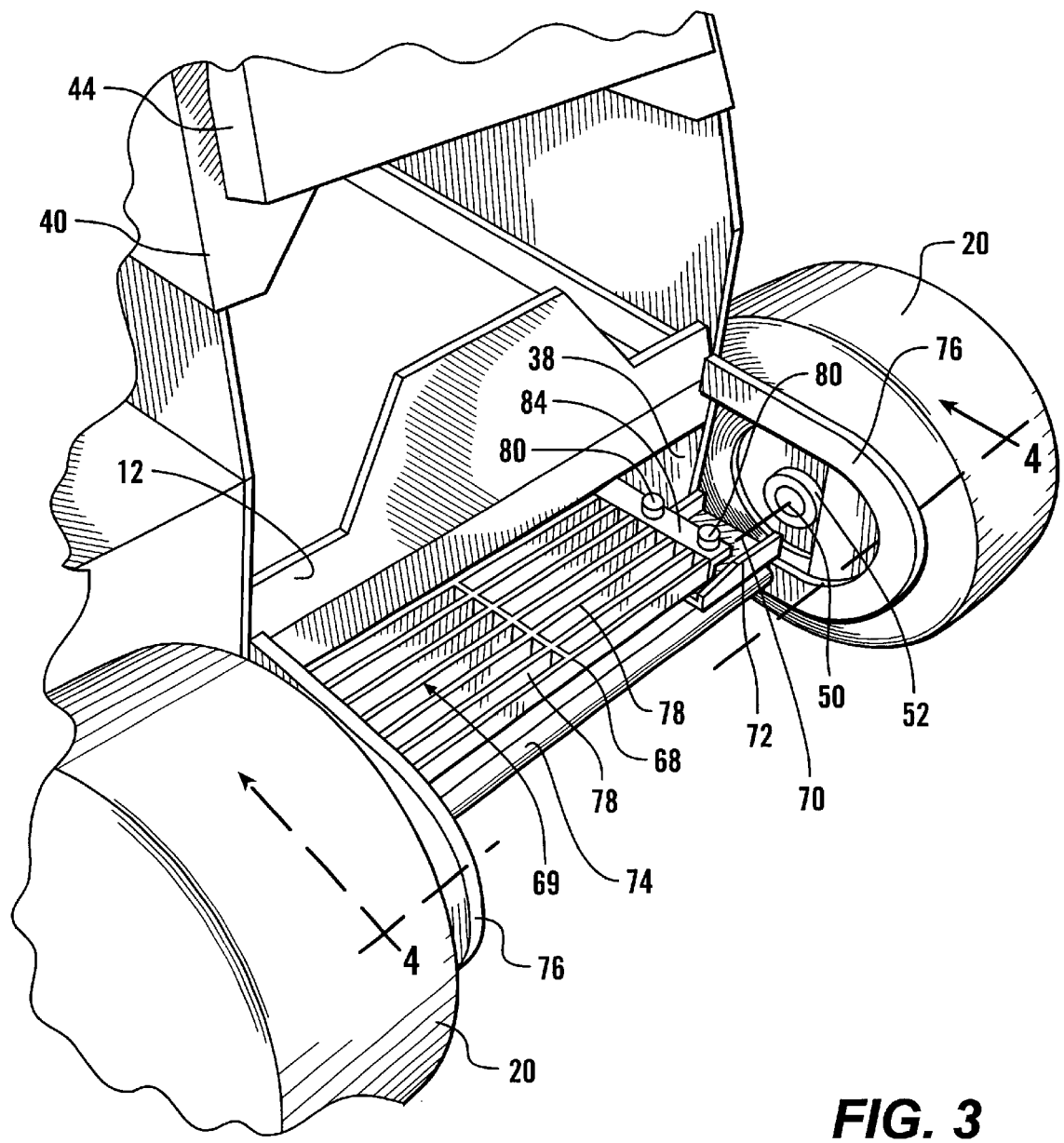
FIG. 3 is a perspective view of the rear of the lawn mower, showing the platform attached to the frame of the mower.
Figure 4:
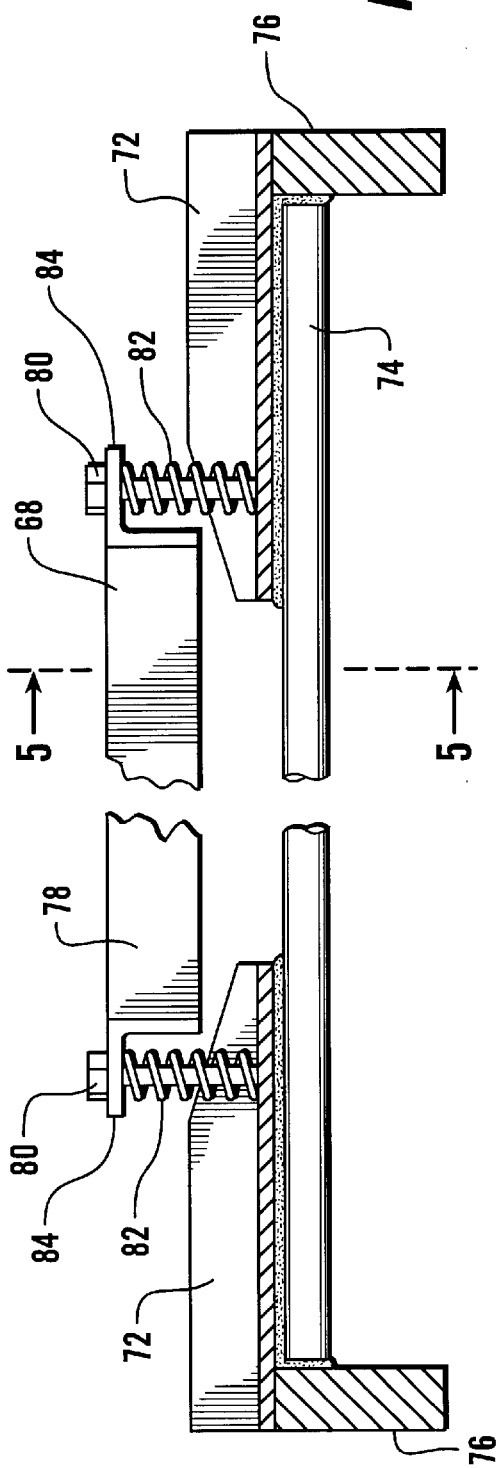
FIG. 4 is a fragmentary cross-sectional view of the platform attached to the frame taken along line 4—4 of FIG. 3.
Figure 5:
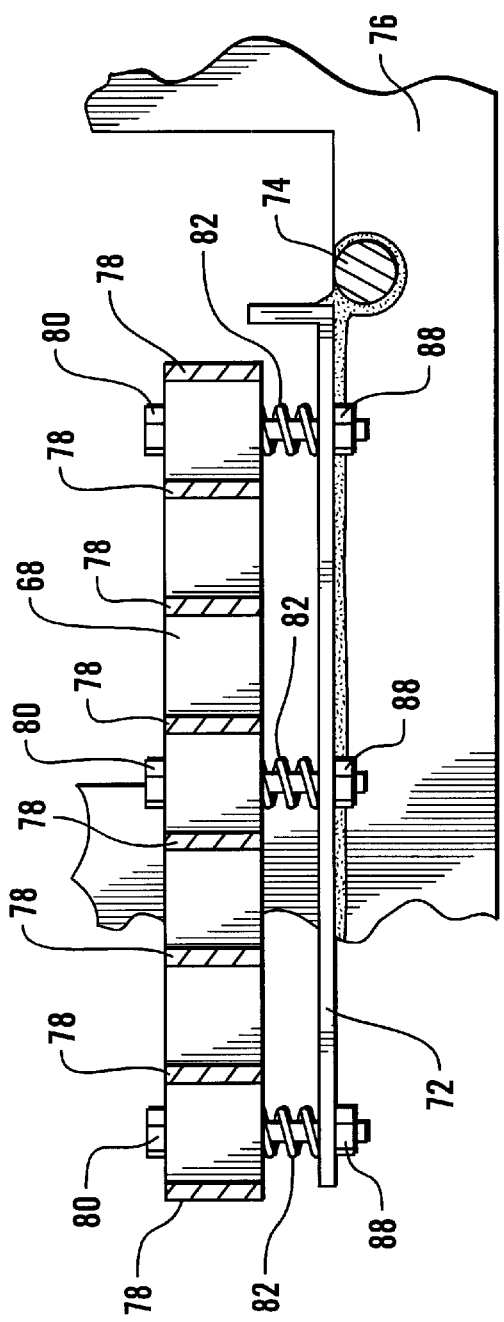
FIG. 5 is a cross-sectional view of the platform attached to the frame taken along line 5—5 of FIG. 4.

As shown in FIG. 3, the invention provides for a platform 68 positioned between the rear drive wheels 20 and in front of or forward of a vertical plane that contains the rotational axis 70 of the rear wheel 20. In the most preferred embodiment, at least the center 69 of the platform 68 is positioned forward of the rotational axis 70 of the rear wheels 20. The platform 68 is capable of supporting an operator 42 in a standing position on the mower. In the embodiment shown, the platform 68 is attached to rear frame members 72 on the right and left sides of the mower below the rotational axis 70 of the rear drive wheels 20. The rear frame members 72 are preferably welded to the horizontal portion 38 of the frame 12, and to a cross-member 74 extending between wheel frame members 76, as shown in FIGS. 4 and 5. In the embodiment shown, the platform is preferably made up of a framework of parallel or latticed slats 78 extending between attachment brackets 84 at opposite ends of the platform 68. The platform 68 is preferably made of metal sturdy enough to support the weight of an operator, with a reasonable margin of safety.

As shown best in FIGS. 4 and 5, the platform 68 is attached to the rear frame members 72 by a plurality of fasteners 80 extending through apertures in the attachment brackets 84. The fasteners 80 are preferably comprised of bolts having a shaft with a head at one end and the other end of the shaft having threads for accepting a nut 88 to hold the platform 68 on the frame 12. In this embodiment, the platform 68 is preferably spring biased with a plurality of helical springs 82 positioned around the shafts of the fasteners 80 between the attachment brackets 84 and the rear frame members 72. The springs 82 act as shock absorbers to provide a smoother, less bouncy ride for the operator 42 standing on the platform 68. The present invention provides greater comfort for the operator. In the most preferred embodiment of the invention, the vertical position of the platform 68 is about equal to the level of the cutting blades 18.

With an operator standing on the platform 68, the center of gravity of the mower is toward the center of the mower near the engine 16. Positioning the platform 68 in front of the rear wheel axis of rotation 70 greatly improves the stability and safety of the mower, especially on hilly terrain. Furthermore, the platform 68 and the operator's feet are fully protected by the rear wheels 20 when backing up over curbs and other obstacles.

Figure 6:
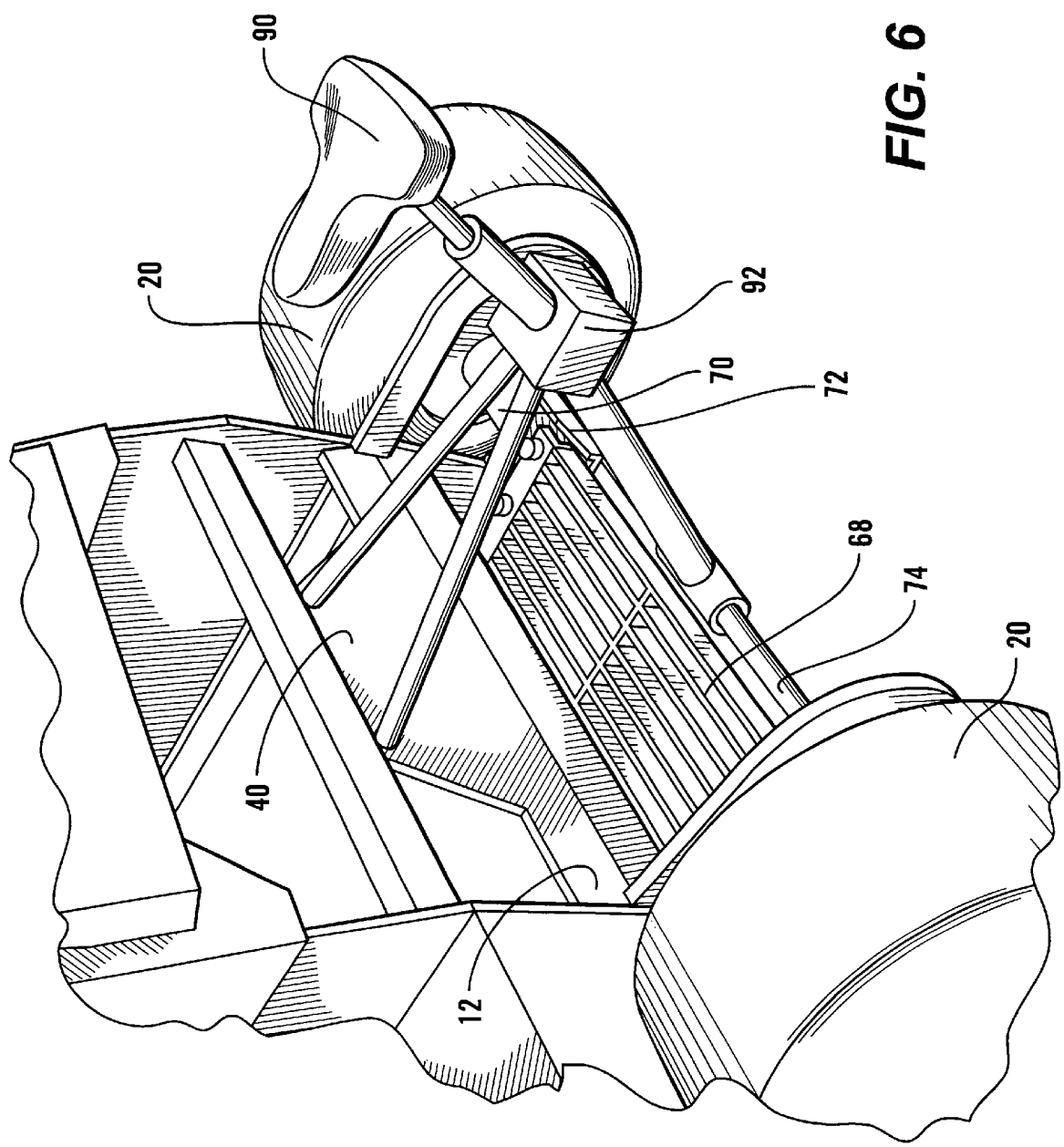
FIG. 6 is a perspective view of the rear of a lawn mower, showing a bicycle-type seat attached to the frame of the mower above the platform.

In another embodiment of the invention, FIG. 6 shows a seat 90 attached to the rear of the mower substantially above the platform 68. The seat 90 includes an attachment mechanism 92 designed to be removably attached to the rear frame 40, 72 or 74, so that an operator can choose between a standing position and a seated position. The seat 90 is preferably a bicycle-type seat, which may be removably attached to the frame 12, so that the seat 90 is at or near a vertical plane created by the rotational axis 70 of the rear wheels 20. The seat 90 is located much higher than conventional, and is adjustable to be about the height of the crotch or buttocks of a standing operator. The seat 90 may be used to relieve the body weight from fatiguing legs and feet of an operator. Even though a preferred embodiment is shown, the seat 90 may be removably attached to the frame 12 in any manner known in the art.

Figure 7B:
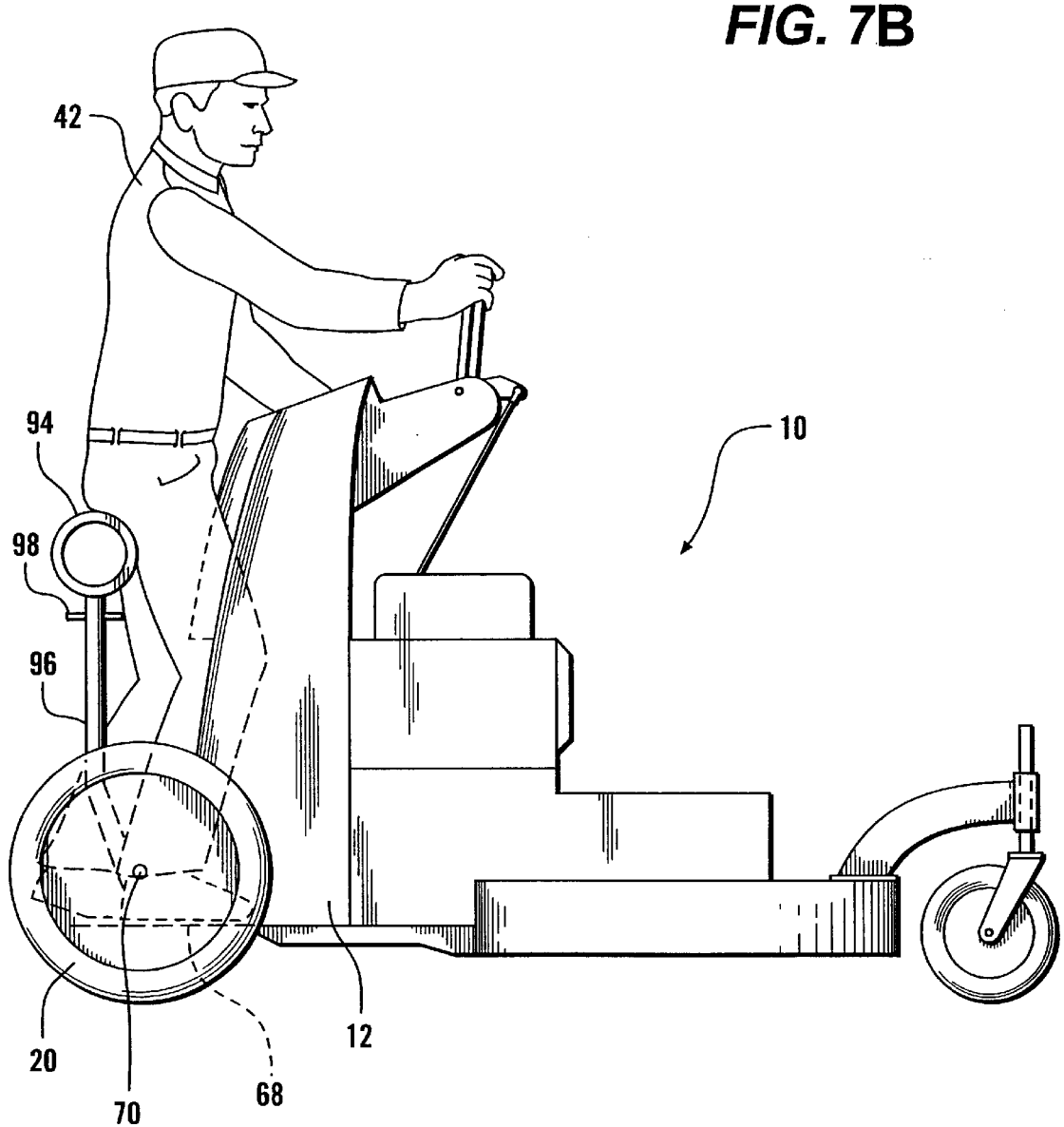
FIG. 7B is a side elevational view of the lawn mower, showing the bolster-type seat attached to the frame of the mower above the platform.

FIGS. 7A and 7B show another embodiment of the invention. In this embodiment, a bolster-type seat 94 is attached to the rear of the mower 10 substantially above the platform 68. The seat 94 includes an attachment mechanism 96 designed to be removably attached to the rear frame 12 or 74, so that an operator can choose between a standing position and a seated position. The seat 94 preferably includes a pin 98 extending through the attachment mechanism 96 for adjusting the height of the seat 94. The seat 94 is preferably located at or near a vertical plane created by the rotational axis 70 of the rear wheels 20. The seat 94 is located much higher than conventional, and is adjustable to be about the height of the crotch or buttocks of a standing operator 42. The seat 94 is preferably used to relieve the body weight from fatiguing legs and feet of an operator 42. Even though a preferred embodiment is shown, the seat 94 may be removably attached to the frame 12 in any manner known in the art.

While the invention has been described with reference to preferred embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

What is claimed is:

1. A lawn mower comprising:
a frame having a substantially horizontal portion and a substantially vertical portion, the substantially horizontal portion having a front end and a rear end, the substantially vertical portion positioned toward the rear end of the horizontal portion, with the rear end of the horizontal portion extending rearwardly past the vertical portion of the frame;
a mower deck with an engine mounted thereto for powering a plurality of cutting blades mounted within the mower deck and at least two rear drive wheels rotationally mounted to the rear end of the horizontal portion and the vertical portion of the frame, the rear drive wheels positioned substantially rearwardly past the vertical portion of the frame and having a horizontal axis of rotation at the rear end of the horizontal portion of the frame; and
a platform attached to the frame for accommodating a standing operator, the platform mounted and spring biased to frame members attached to the rear end of the horizontal portion of the frame at opposite ends of the platform, wherein the platform does not extend past a vertical plane created by the horizontal axis of rotation of the rear drive wheels, and wherein the rear drive wheels are the rearmost portion of the lawn mower.

2. The lawn mower of claim 1 further comprising a padded cushion attached to the vertical portion of the frame for supporting a standing operator.

3. The lawn mower of claim 1 further comprising a plurality of operator controls mounted to an operator console extending outwardly from an upper end of the vertical portion of the frame for controlling the rear drive wheels.

4. The lawn mower of claim 1 further comprising at least one ground engaging caster wheel mounted forward of the mower deck by a bracket assembly attached to the mower deck.

5. The lawn mower of claim 1 wherein power is applied from the engine to the rear drive wheels and the cutting blades through a belt and pulley assembly, the belt and pulley assembly being coupled to a drive system.

6. The lawn mower of claim 5 wherein the drive system includes at least one hydraulic pump feeding at least one hydraulic motor to drive the rear wheels.

7. The lawn mower of claim 6 wherein each hydraulic motor is in fluid communication with its respective hydraulic pump through a plurality of hoses.

8. The lawn mower of claim 6 wherein the rear drive wheels are mounted on axles of the hydraulic drive motors.

9. The lawn mower of claim 8 wherein the platform is positioned completely in front of the rear wheel axles so that the center of gravity of the mower is toward the center of the mower near the engine to provide greater stability and safety for the operator, especially when going up a hill.

10. A powered lawn mower comprising:

a frame having a substantially horizontal portion and a substantially vertical portion, the substantially horizontal portion having a front end and a rear end, the substantially vertical portion positioned toward the rear end of the horizontal portion, with the rear end of the horizontal portion extending rearwardly past the vertical portion of the frame;

a mower deck with an engine mounted thereto for powering a plurality of cutting blades mounted within the mower deck and at least two rear drive wheels mounted to the rear end of the horizontal portion of the frame and the vertical portion of the frame, the rear drive wheels positioned substantially rearwardly past the vertical portion of the frame and rotating about a rotational axis at the rear end of the horizontal portion of the frame; and a platform attached to the rear end of the horizontal portion of the frame for accommodating a standing operator, the platform mounted and spring biased to frame members attached to the rear end of the horizontal portion of the frame at opposite ends of the platform, wherein the platform is positioned between the rear drive wheels and does not extend past a vertical plane created by the rotational axis of the rear drive wheels, and wherein the rear drive wheels are the rearmost portion of the lawn mower.

11. The powered lawn mower of claim 10 wherein the platform is attached to rear frame members on right and left sides of the mower below the rotational axis of the rear drive wheels.

12. The powered lawn mower of claim 11 wherein the rear frame members are attached to the horizontal portion of the frame and a cross member attached between wheel frame members.

13. The powered lawn mower of claim 10 wherein the platform is made up of a framework of parallel or latticed slats extending between attachment brackets at opposite ends of the platform.

14. The powered lawn mower of claim 13 wherein the platform is attached to the rear frame members by a plurality of fasteners extending through apertures in the attachment brackets.

15. The powered lawn mower of claim 14 wherein the fasteners are comprised of bolts having a shaft with a head at one end and the other end of the shaft having threads formed therein for accepting a nut to hold the platform on the frame.

16. The powered lawn mower of claim 15 wherein the platform is spring biased with a plurality of springs positioned around the shafts of the fasteners between the attachment brackets and the rear frame members.

17. A self-propelled lawn mower comprising:

a frame having a substantially horizontal portion and a substantially vertical portion, the substantially horizontal portion having a front end and a rear end, the substantially vertical portion positioned toward the rear end of the horizontal portion, with the rear end of the horizontal portion extending rearwardly past the vertical portion of the frame;

a mower deck with an engine mounted thereto attached to the front end of the horizontal portion of the frame for powering a plurality of cutting blades mounted within the mower deck and at least two rear drive wheels mounted to the rear end of the horizontal portion of the frame and the vertical portion of the frame, the rear drive wheels positioned substantially rearwardly past the vertical portion of the frame and having horizontal axis of rotation at the rear end of the horizontal portion of the frame;

a plurality of operator controls mounted to an operator console extending outwardly from an upper end of the vertical portion of the frame for controlling the rear drive wheels; and a platform attached to the rear end of the horizontal portion of the frame for accommodating a standing operator, the platform mounted and spring biased to frame members attached to the rear end of the horizontal portion of the frame at opposite ends of the platform, wherein the platform is positioned between the rear drive wheels and does not extend past a vertical plane created by the rotational axis of the rear drive wheels, and wherein the rear drive wheels are the rearmost portion of the lawn mower.

18. The self-propelled lawn mower of claim 17 further comprising a padded cushion attached to the rear portion of the frame for supporting the standing operator.

19. The self-propelled lawn mower of claim 17 wherein the platform is spring biased.

20. The self-propelled lawn mower of claim 17 wherein the platform is positioned completely in front of the rear wheel axis of rotation, so that the center of gravity of the mower is toward the center of the mower to provide greater stability and safety for the operator.

21. The self-propelled lawn mower of claim 17 wherein the center of gravity of the lawn mower with the operator standing on the platform is toward the center of the mower near the engine to greatly improve the stability and safety of the mower.

\* \* \* \* \*